(12) United States Patent
Weigl et al.

(10) Patent No.: US 6,611,193 B1
(45) Date of Patent: Aug. 26, 2003

(54) VEHICLE SECURITY DEVICE

(75) Inventors: Andreas Weigl, Linkenheim-Hochstetten (DE); Karl-Ernst Weiss, Ettlingen (DE); Clemens Schroff, Ubstadt-Weiher (DE); Bernd Diebold, Rheinau (DE); Bernd Weyerstall, Wuppertal (DE); Thomas Riehemann, Bühlertal (DE); Piotr Szablewski, Wuppertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,144

(22) PCT Filed: Aug. 26, 1997

(86) PCT No.: PCT/DE97/01849

§ 371 (c)(1),
(2), (4) Date: Dec. 22, 1999

(87) PCT Pub. No.: WO98/12084

PCT Pub. Date: Mar. 26, 1998

(30) Foreign Application Priority Data

Sep. 16, 1996 (DE) .......................................... 196 37 657

(51) Int. Cl.⁷ .......................... H04Q 1/00; G05B 19/00
(52) U.S. Cl. ....................... 340/5.2; 340/426; 307/10.2
(58) Field of Search ............................. 340/5.21, 5.61, 340/5.72, 5.26, 426, 428, 5.2, 5.31; 307/10.6, 10.3, 10.2

(56) References Cited

U.S. PATENT DOCUMENTS

| 5,229,648 | A | * | 7/1993 | Sues et al. | 340/5.31 |
|---|---|---|---|---|---|
| 5,670,933 | A | * | 9/1997 | Hayashi | 340/426 |
| 5,708,307 | A | * | 1/1998 | Iijima et al. | 307/10.5 |
| 5,796,329 | A | * | 8/1998 | Bachhuber | 340/426 |
| 5,811,885 | A | * | 9/1998 | Griessbach | 340/5.64 |
| 5,886,421 | A | * | 3/1999 | Mizuno | 307/10.5 |
| 6,008,722 | A | * | 12/1999 | Hirozawa et al. | 340/426 |

FOREIGN PATENT DOCUMENTS

| DE | 4331664 | 6/1994 |
|---|---|---|
| DE | 4325657 | 2/1995 |
| DE | 4434450 | 3/1996 |
| DE | 19526530 | 8/1996 |
| EP | 0600243 | 6/1994 |
| EP | 0695675 | 2/1996 |
| GB | 2294144 | 4/1996 |
| WO | WO 9015211 | 12/1990 |
| WO | WO 9305987 | 4/1993 |
| WO | WO 9620100 | 7/1996 |

* cited by examiner

*Primary Examiner*—Brian Zimmerman
(74) *Attorney, Agent, or Firm*—Kenyon & Kenyon

(57) ABSTRACT

A vehicle security arrangement includes at least one functional control unit, which provides a first code word; a theft protection control unit, which is coupled via a bus to the at least one functional control unit; and at least one input unit, which transmits to the theft protection control unit a second code word which the theft protection control unit forwards to the at least one function control unit. The theft protection control unit may initiate the provision of the first code word and the second code word. In the at least one functional control unit, a comparison of the first code word of the at least one functional control unit with the second code word takes place. In case of agreement between the first code word and the second code word, the at least one functional control unit enables itself.

20 Claims, 4 Drawing Sheets

VEHICLE SECURITY DEVICE

FIELD OF THE INVENTION

The present invention generally relates to security systems, and more particularly to a vehicle security arrangement.

BACKGROUND INFORMATION

From, German Patent No. 43 25 657 describing a theft prevention mechanism for vehicles brought about by specifically blocking assemblies critical to operation. Action modules handle the disabling or enabling of the respectively assigned modules. A code stored on a code key is detected by a code reader and forwarded to all action modules. A logic unit of the action module compares the code with information stored in the code memory of the action module. If both do not agree, the action module deactivates the associated functional assembly. It is also provided that in case of a mismatch, the action module can bring about the destruction of the relevant assembly. Data transmission and data comparison in the action modules are triggered by introducing the code key into the code reader.

SUMMARY OF THE INVENTION

The present invention provides a vehicle security arrangement that realizes increased theft protection.

According to the present invention, improved theft protection is achieved in that the enabling of each functional control unit takes place as a function of a comparison of two code words. The first code word is provided by the respective functional control unit and the second code word is provided by an input unit. The theft protection control unit initiates the provision of both code words. By incorporating multiple functional control units relevant to travel operation, the security against unauthorized start-up of the vehicle is further increased. Each functional control unit checks for itself whether an authorized user is accessing the vehicle. This renders it more difficult, in particular, to exchange functional control units with units coming, e.g., from stolen vehicles, since the functional control units must be matched to the theft protection control unit and also to the input unit. If this is not the case, then the functional control unit denies its usage. The control of the enabling procedure by the theft protection control unit increases the security against monitoring by influencing code words in a randomly controlled manner. The theft protection control unit affects a precise preselection which gets the authorization of the possibly multiple input units to provide the second code word.

The present invention further provides that a forwarding of the second code word, which is provided by the input unit, to the functional control unit takes place if the second code word matches the code word expected by the theft protection control unit. A further authorization query performed in the theft protection control unit increases the theft protection. The measure also increases the convenience, for instance, if due to transmission error(s) the second code word arrives garbled at the theft protection control unit. This can trigger a request to the input unit to repeat the transmission or provision procedure of the second code word without the incorrect second code word already having led to a malfunction of the functional control units.

The present invention may also provide an authorization algorithm or keyword or both assisting in the generation of the first and the second code words. Particularly with a vehicle-specific keyword, the authorization algorithm can be chosen the same for each vehicle. This separation ensures on the one hand that an individual code word is assigned to each vehicle. On the other hand, it is guaranteed for the manufacturer that by using one and the same authorization algorithm for each vehicle, a high degree of standardization is achieved, which becomes noticeable in terms of decreased costs in the manufacturing process.

The present invention may also provide that to generate the first and second code words, a third code word is used whose provision takes place through the theft protection control unit. Protection against monitoring can be realized in this manner by drawing upon, for example, another third code word, randomly controlled, for each initiation procedure. Constant communication procedures are thus avoided, thereby decreasing the risk of transferring the vehicle through intentional manipulation into a driveable state.

The present invention may also provide that the initiation of the theft protection control unit occurs after actuating a switch. The coupling of the enabling process, e.g., with an ignition lock, increases the security by also taking into account conventional locking devices.

The present invention may also provide, for example, transponders and/or electronic chip cards input units. The transponder increases the convenience through wireless communication with the theft protection control unit. The electronic chip card is advantageous in that the mechanical accessibility of the read unit can be made more difficult through additional control mechanisms, which further enhances security.

The present invention may also provide a master input unit containing the keyword. This master input unit is required if functional control units or input units are to be exchanged. The exchange of vehicle-specific modules in stolen vehicles is made considerably more difficult in this manner.

The present invention may also provide a technique for parametrizing a vehicle security arrangement, the functional control unit and theft protection control unit being operated in a parametrizing mode. An additional device informs the functional control unit and the theft protection control unit of the vehicle-specific keyword which is then forwarded on the part of the theft protection control unit to the input device. This procedure enables a favorable parametrizing process from a manufacturing-engineering viewpoint at the end of the assembly line.

DETAILED DESCRIPTION

Figure 1:
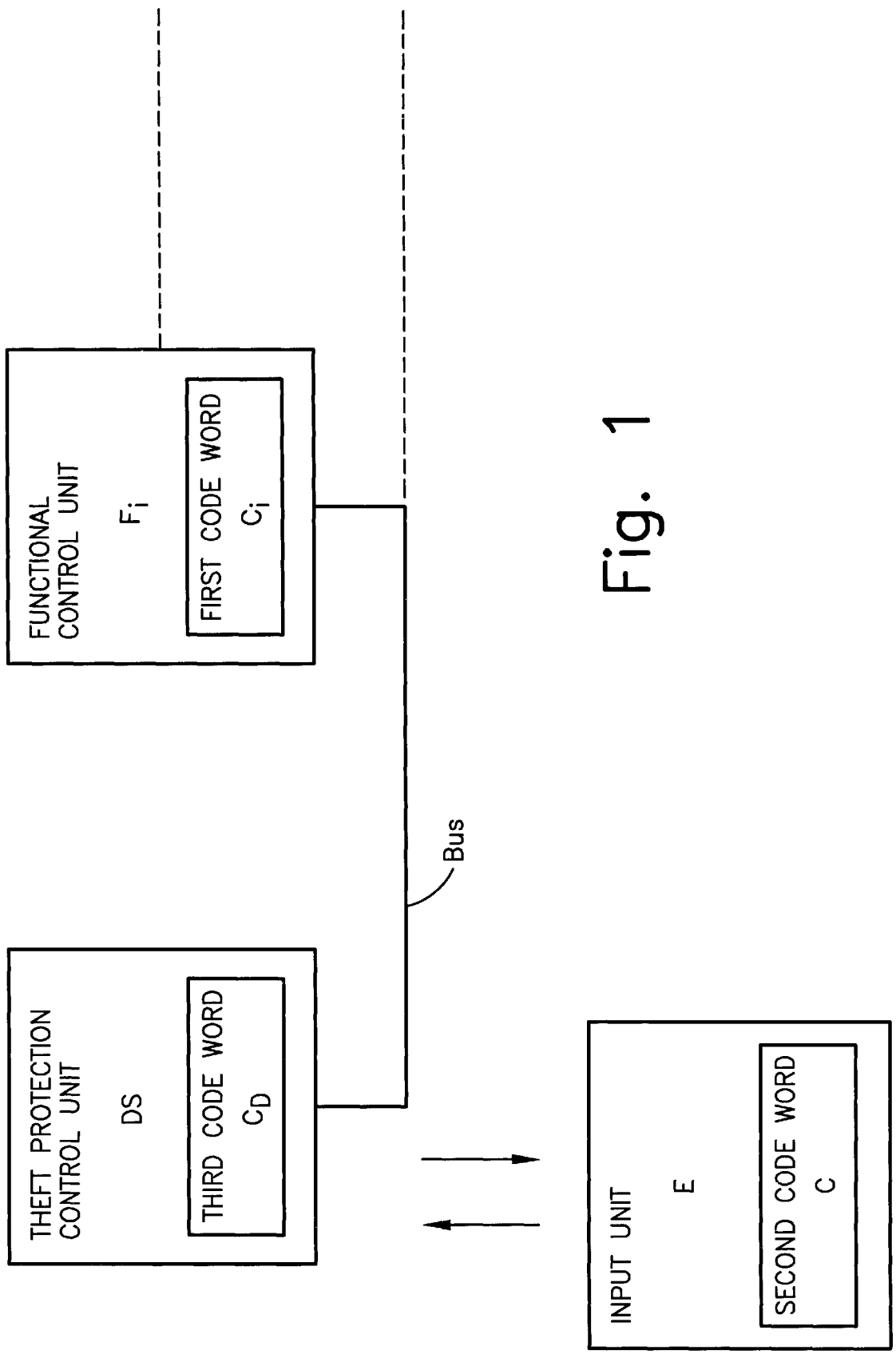
FIG. 1 illustrates a block diagram of one embodiment of a vehicle security arrangement.

FIG. 1, illustrates a theft protection control unit DS in interaction with at least one functional control unit $F_i$ via a bus. The theft protection control unit DS communicates with an input unit E. The functional control unit $F_i$ provides a first code word $C_i$, the input unit E a second code word C, the theft protection control unit DS a third code word $C_D$.

Each of the functional control units $F_i$ —here, the index stands for the ith functional control unit $F_i$ —generates in each case for itself the first code word $C_i$. In a vehicle, depending on the outfitting, different functional control units $F_i$ are present, e.g., control units for engine control, automatic transmission control, anti-lock systems, anti-slip control, starting of control, power steering, ignition control, central interlocking or level control. All are required for smooth operation of the vehicle. Each functional control unit $F_i$ generates the first code word $C_i$ for itself and independent of the others. The algorithms and data required are stored in each individual functional control unit $F_i$. The data exchange among the functional control units $F_i$ as well as with the theft protection control unit DS takes place via the bus.

The input unit E is enabled, e.g., through an algorithm, to provide the second code word C as a function of a keyword. A transponder is used as input unit E. The transponder contains transmitters as well as receivers for electromagnetic waves and can assume, for example, the form of an electronic chip card, formed as a key trailer or integrated in the vehicle key. Multiple input units E formed as transponders enable usage of the same vehicle by multiple persons. Besides wireless communication, an electronic chip card can also be used as input unit E. Assigned to the card is a card read/write station into which the card must be introduced. The data transmission between the input unit E and the theft protection control unit DS can be realized in any appropriate manner e.g., infrared communications.

The theft protection control unit DS handles the data exchange with the input unit E.

Figure 2:
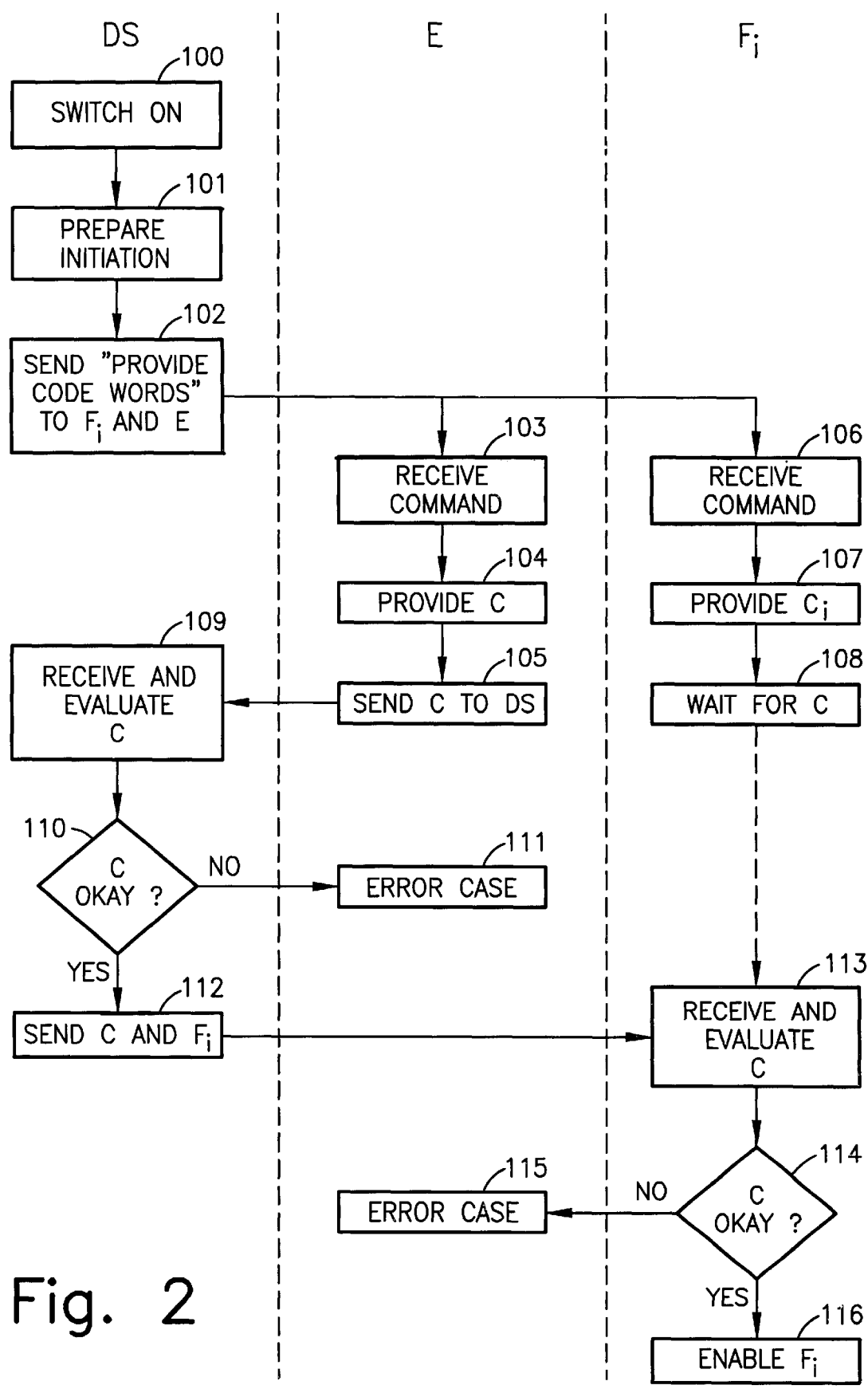
FIG. 2 shows a flowchart illustrating the operation of one embodiment of the vehicle security arrangement.

Referring to FIG. 2, the functioning of the arrangement illustrated in FIG. 1 is described hereafter. The start of the driving authorization procedure is triggered by step 100, Switch ON. The switch is actuated, e.g., via an ignition key. In this manner, the theft protection control unit DS recognizes that it is desired to start the vehicle.

It then prepares the initiation, step 101. The data exchange of the theft protection control unit DS with input units E and functional control units $F_i$ takes place according to a "challenge/response" process. The theft protection control unit DS generates a challenge. The challenge can contain a command and/or the third code word $C_D$. The command triggers in the respective receiver—functional control unit $F_i$ and input unit E according to one embodiment of the present invention a data processing procedure in which the first and second code word $C_i$, C are generated. If the third code word $C_D$ is transmitted as additional information of the challenge along with the command, a random generator integrated in the theft protection control unit DS can re-provide for reasons of monitoring security the third code word $C_D$ for each authorization check. Similarly the step 101 may include selecting a special input unit E to which the challenge is to be transmitted. In this manner, certain input units E can be intentionally disabled in case they were lost. The present invention also contemplates addressing in a preferred manner the one input unit E with which the vehicle was last used.

In a step 102, the theft protection control unit DS transmits the challenge provided in step 101. It contains the command "Provide code word" and possibly, the third code word $C_D$. All functional control units $F_i$ connected to the bus and the input units E selected on the part of the theft protection control unit DS receive this challenge. Input unit E as well as functional control units $F_i$ provide their code words C, $C_i$ after they have received the command of the theft protection control unit DS in step 103 and 106 respectively. In step 104, the respective input unit E begins to generate the second code word C. Here, an authorization algorithm stored in the input unit E is initiated which computes the second code word C as a function of, for example, a vehicle-specific keyword and/or the third code word $C_D$.

The connected functional control units $F_i$ proceed likewise independently of one another. In a step 107, each functional control unit $F_i$ provides for itself the first code word $C_i$ as a function of an authorization algorithm. The algorithm is stored separately in each functional control unit $F_i$. It computes the corresponding first code word $C_i$ as a function of, for example, the vehicle-specific keyword and/or of the third code word $C_D$.

It should be noted that the general principle for generating the code word $C_i$, C must agree in the functional control units $F_i$ among one another and is identical to the input unit E. The authorization algorithm and the data which it accesses must agree in functional control unit $F_i$ and input unit E to be able to bring the vehicle into operation. If the authorization algorithm of the functional control unit $F_i$ accesses the keyword, then the authorization algorithm of the input unit must also proceed in the same manner. If the authorization algorithm of the functional control unit $F_i$ requires the third code word $C_D$, then the authorization algorithm of the input unit E must also fall back upon it. Therefore, if the authorization algorithm, the respectively used keyword and possibly the third code word agree for the functional control unit $F_i$ and the input unit E, then the first and second code word, $C_i$, C are identical.

The input unit E generates and provides the second code word C in step 104. In a step 105 the input unit E transmits the second code word C to the theft protection control unit DS. The latter receives the second code word C and possibly evaluates it in step 109. For evaluation, for example, a control code word may be computed as a function of the authorization algorithm the keyword, or both which are stored in the theft protection control unit DS. If the authorization algorithm of step 104 also uses the third code word $C_D$, then it must also be taken into account accordingly in step 109. Subsequently, a comparison of the second code word C with the control code word takes place. In step 110, the query takes place whether the second code word C is okay. If this is not the case, i.e., the second code word C and the control code word are different, then an error case is present, step 111. It is imaginable to repeat the steps 102 to 110 again in order to avoid transmission errors between the input unit E and the theft protection control unit DS. However, the error case could also lead immediately to the further prevention of the enabling of the functional control units $F_i$. If, according to the query, step 110, the second code word C is okay, then a step 112 follows. Here, the theft protection control unit DS transmits the second code word via the bus to all functional control units $F_i$. The second code word C is forwarded here unprocessed directly as the result determined by the input unit E.

During the previously described steps, the functional control units $F_i$ wait in a step 108 for the second code word C. All functional control units $F_i$ receive the second code word C and evaluate it in, step 113. Each functional control unit $F_i$ performs in a query 114 a comparison of the second code word C with the first code word $C_i$ provided respectively in step 107. The two code words C, $C_i$ then agree if, respectively, authorization algorithm, keyword and possibly the third code word $C_D$, stored once in the input unit E, once in the functional control unit $F_i$, are identical. If the first and second code words $C_i$, C do not agree, then the error case applies, step 115. In the error case, the corresponding functional control unit $F_i$ does not enable itself and thus blocks the starting process. If the first and second code words $C_i$, C agree, then the relevant functional control unit $F_i$ enables itself in, step 116. As already explained, each of the functional control units $F_i$ executes the steps 106 to 108 and 113 to 116 as a function of the respective authorization algorithm and keyword which are stored in the respective functional control units $F_i$. The error case in step 115, can thus also occur if, for example, when exchanging a functional control unit $F_i$ either the authorization algorithm does not agree with the one stored in the input unit or if the vehicle-specific keywords of the input unit E and the functional control unit $F_i$ deviate from one another. Thus, the unauthorized exchange of a functional control unit $F_i$ also blocks the start process.

Figure 3:
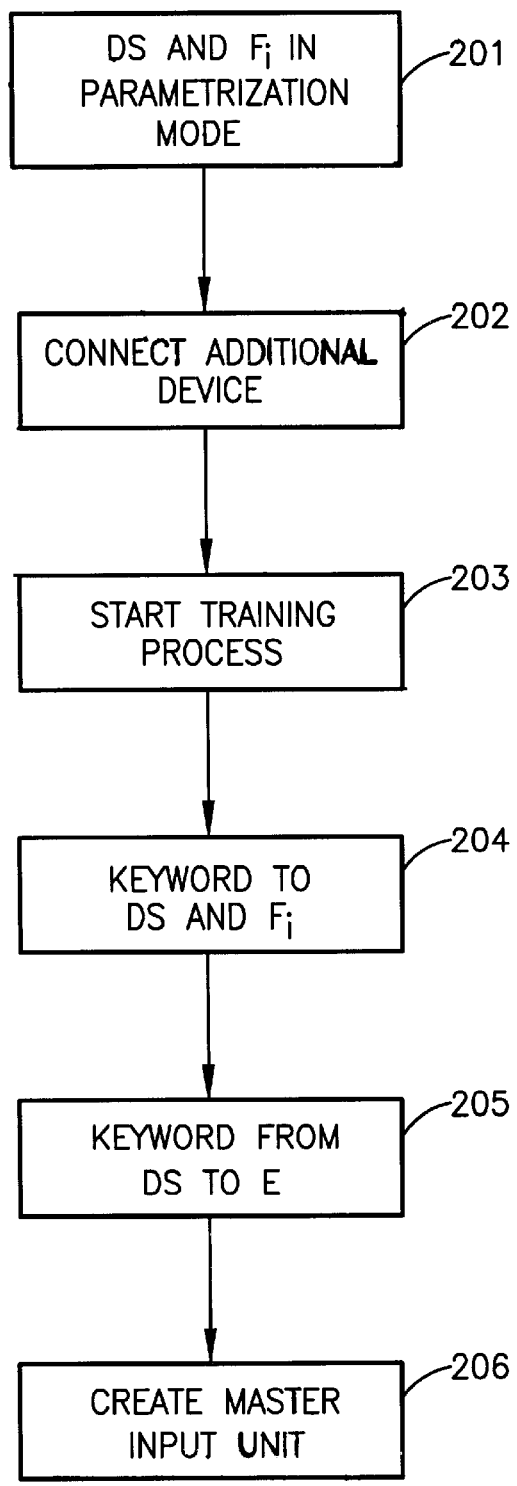
FIG. 3 shows a flowchart illustrating an initial start-up process for one embodiment of the vehicle security arrangement.

Referring to FIG. 3, one embodiment for start-up of the vehicle security arrangement according to the present invention is described. The subsequently described process steps can be carried out, for example, at the end of the assembly line after installation of the functional control units $F_i$ in the motor vehicle. According to step 201, the theft protection control unit DS and the functional control units $F_i$ are operated in a parametrization mode. Here, it is contemplated that the authorization algorithm is already implemented in each case in a fixed manner in the theft protection control unit DS and in the functional control units $F_i$. For successful execution of the authorization procedure, the vehicle-specific keyword is necessary. In a next step 202, an additional device is connected. For example, via a provided diagnostics interface, the additional device can communicate via the bus both with the theft protection control unit DS as well as with the functional control units $F_i$. With the aid of the additional device, the training procedure can be started, for example by operating personnel in, step 203. Subsequently, in a step 204, the keyword is transmitted to the theft protection control unit DS and to the functional control units $F_i$. These transmission processes may possibly be verified through suitable control procedures. Subsequently, the theft protection control unit DS transmits the keyword to the input unit E in, step 205. Particularly with regard to later maintenance work, it may be advantageous to assign different authorization functions to the input units E. It can thus be provided that the parametrization of an exchanged functional control unit $F_i$ can take place only in conjunction with a master input unit. Also, the training of new input units E can be performed properly only in conjunction with the master input unit. After step 205, in a step 206 an input unit E is selected which as the master input unit is assigned a special authorization.

Figure 4:
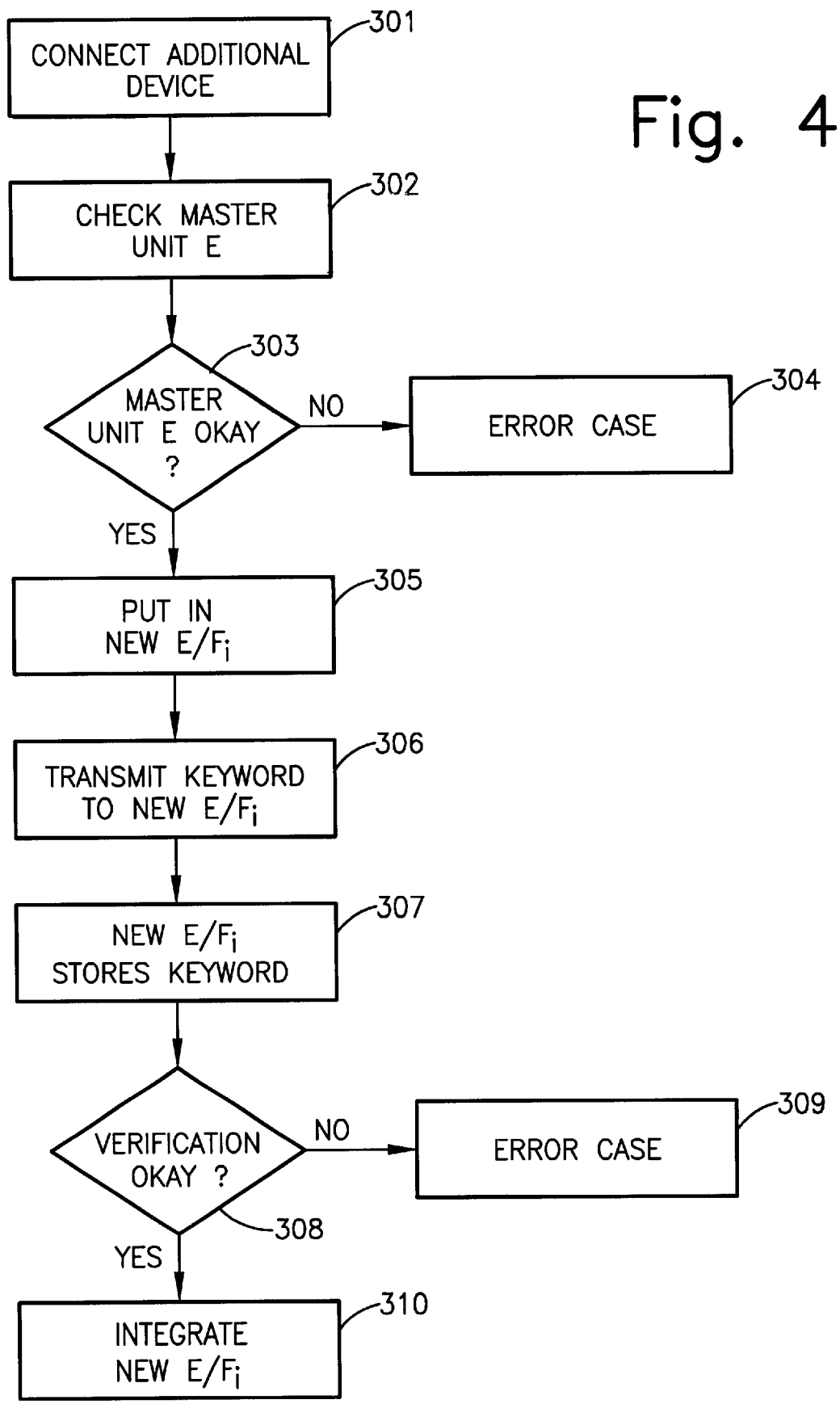
FIG. 4 shows a flowchart illustrating how to parametrize new input units and new functional control units for one embodiment of the vehicle security arrangement.

In the flowchart illustrated in FIG. 4, one embodiment according to the present invention described for how to parametrize new input units E and new functional control units $F_i$ following the initial start-up. In a step 301, an additional device is connected, e.g., to a diagnostics interface. Then, in step 302 the master input unit is checked, e.g., through the challenge-response process as described above. If the master input unit is not okay, query 303, the process is interrupted as the error case in, step 304. If the master input unit is okay, then the authorization exists in a step 305 to install a new functional control unit $F_i$ in the motor vehicle or to train a new input unit E. If the new input unit E or the new functional control unit $F_i$ are capable of exchanging data, then the keyword is transmitted to them in a step 306. The keyword is stored by, the new input unit E or by the new functional control unit $F_i$ in step 307. This training process is checked in a query 308, "Verification okay?". This verification may include, for example, the theft protection control unit DS, according to the challenge-response process already described, demanding a first or second code word $C_i$, C from the new functional control unit $F_i$ or from the new input unit E which is compared with the control code word computed in the theft protection control unit DS. If the verification is not okay, then the training procedure can be interrupted or possibly repeated in, step 309. If the verification is okay, then the new functional control units $F_i$ and new input units E are integrated in, step 310. The present invention to the new input unit E in the theft protection control unit DS a specific receiver code in order to be able to selectively control the new input unit E. These data could possibly also be communicated to the master input unit.

What is claimed is:

1. A vehicle security arrangement for a vehicle, comprising:

a theft protection control unit;

at least one functional control unit, wherein the at least one functional control unit is coupled to the theft protection control unit via a bus and generates, during normal operation of the vehicle, a first code word in response to a request by the theft protection control unit; and at least one input unit, wherein the at least one input unit, in response to a request from the theft protection control unit, generates and transmits a second code word to the theft protection control unit, and wherein the theft protection control unit forwards the second code word to the at least one functional control unit via the bus, wherein the at least one functional control unit compares the first code word with the second code word and, in the case of an agreement, the at least one functional control unit enables itself.

2. The vehicle security arrangement according to claim 1, wherein the first code word is generated based on a keyword.

3. The vehicle security arrangement according to claim 2, wherein the keyword is vehicle-specific.

4. The vehicle security arrangement according to claim 2, wherein the at least one input unit includes a master input unit having the keyword.

5. The vehicle security arrangement according to claim 1, wherein the second code word is generated based on a keyword.

6. The vehicle security arrangement according to claim 5, wherein the keyword is vehicle-specific.

7. The vehicle security arrangement according to claim 5, wherein the at least one input unit includes a master input unit having the keyword.

8. The vehicle security arrangement according to claim 1, wherein the first code word is generated from a third code word provided by the theft protection control unit.

9. The vehicle security arrangement according to claim 8, wherein the third code word is randomly generated.

10. The vehicle security arrangement according to claim 1, wherein the second code word is generated from a third code word provided by the theft protection control unit.

11. The vehicle security arrangement according to claim 10, wherein the third code word is randomly generated.

12. A vehicle security arrangement for a vehicle, comprising:

a theft protection control unit;

at least one functional control unit, wherein the at least one functional control unit is coupled to the theft protection control unit via a bus and generates, during normal operation of the vehicle, a first code word in response to a request by the theft protection control unit; and at least one input unit, wherein the at least one input unit, in response to a request from the theft protection control unit, generates and transmits a second code word to the theft protection control unit, and wherein the theft protection control unit forwards the second code word to the at least one functional control unit via the bus if the second code word agrees with a code word expected by the theft protection control unit, wherein the at least one functional control unit compares the first code word with the second code word and, in the case of an agreement, the at least one functional control unit enables itself.

13. The vehicle security arrangement according to claim 1, wherein the theft protection unit forwards the second code word to the at least one functional control unit if the second code word agrees with a code word expected by the theft protection control unit.

14. The vehicle security arrangement according to claim 1, wherein the first code word is generated by an authorization algorithm.

15. The vehicle security arrangement according to claim 1, wherein the second code word is generated by an authorization algorithm.

16. The vehicle security arrangement according to claim 1, wherein the at least one input unit includes at least one transponder.

17. The vehicle security arrangement according to claim 1, wherein the at least one input unit includes at least one electronic chip card.

18. The vehicle security arrangement according to claim 1, wherein the at least one input unit includes a master input unit having a keyword.

19. A method for providing vehicle security by using the vehicle security arrangement of claim 1, comprising the steps of:

operating the at least one functional control unit and the theft protection control unit in a parameterizing mode, the at least one functional control unit and the theft protection control unit being coupled by the bus;

coupling an additional device to the bus, the additional device being adapted to initiate a training procedure;

communicating a keyword to the at least one functional control unit and the theft protection control unit; and communicating the keyword from the theft protection control unit to at least one input unit.

20. A method for training at least one of a new input unit and a new functional control unit in the vehicle security arrangement of claim 1, the method comprising:

communicating a keyword from a master input unit to the at least one of the new input unit and the new functional control unit, wherein the at least one of the new input unit and the new functional control unit is parameterized.

* * * * *

UNITED STATES PATENT AND TRADEMARK OFFICE
CERTIFICATE OF CORRECTION

PATENT NO. : 6,611,193 B1
DATED : August 26, 2003
INVENTOR(S) : Andreas Weigl et al.

It is certified that error appears in the above-identified patent and that said Letters Patent is hereby corrected as shown below:

Column 1,
Line 11, change "From, German" to -- German --.
Line 11, change "describing" to -- describes --.

Column 6,
Line 11, change "invention to" to -- invention also contemplates assigning to --.
Line 14, change "could possibly also" to -- may also possibly --.

Signed and Sealed this

Fourth Day of January, 2005

JON W. DUDAS
*Director of the United States Patent and Trademark Office*